(12) United States Patent
Gook et al.

(10) Patent No.: US 12,546,914 B2
(45) Date of Patent: Feb. 10, 2026

(54) FOLDABLE DISPLAY APPARATUS AND MANUFACTURING METHOD OF ADHESIVE LAYER OF THE SAME

(71) Applicant: LG DISPLAY CO., LTD., Seoul (KR)

(72) Inventors: Min Gook, Gwangmyeong-si (KR); Suk Choi, Hwaseong-si (KR)

(73) Assignee: LG DISPLAY CO., LTD., Seoul (KR)

( * ) Notice: Subject to any disclaimer, the term of this patent is extended or adjusted under 35 U.S.C. 154(b) by 741 days.

(21) Appl. No.: 17/874,133

(22) Filed: Jul. 26, 2022

(65) Prior Publication Data

US 2023/0099774 A1    Mar. 30, 2023

(30) Foreign Application Priority Data

Jul. 28, 2021 (KR) .................. 10-2021-0099169

(51) Int. Cl.
*G06F 1/16* (2006.01)
*C08K 5/00* (2006.01)
*C09J 7/10* (2018.01)
*C09J 7/35* (2018.01)
*C09J 7/40* (2018.01)
(Continued)

(52) U.S. Cl.
CPC .............. *G02B 1/14* (2015.01); *C08K 5/0041* (2013.01); *C09J 7/10* (2018.01); *C09J 7/35* (2018.01); *C09J 7/405* (2018.01); *G02B 5/208* (2013.01); *G02B 5/3033* (2013.01); *G09F 9/301* (2013.01); *C09J 2203/318* (2013.01);
(Continued)

(58) Field of Classification Search
CPC ........ G02B 1/14; G02B 5/208; G02B 5/3033; C08K 5/0041; C09J 7/35; C09J 7/405; C09J 2203/318; C09J 2301/304; C09J 2301/408; G06F 1/1652

USPC ......................................................... 428/1.5
See application file for complete search history.

(56) References Cited

U.S. PATENT DOCUMENTS

2014/0160404 A1*  6/2014  Yamada ................. G02B 5/223
                                                                362/19
2015/0124382 A1*  5/2015  Taniguchi ......... G02F 1/133528
                                                                361/679.01
(Continued)

FOREIGN PATENT DOCUMENTS

CN          108219736 A         6/2018
CN          111234716 A         6/2020
(Continued)

OTHER PUBLICATIONS

Office Action issued on Jun. 10, 2025 in Chinese Patent Application No. 202210898456.9 with English translation.

*Primary Examiner* — Ruiyun Zhang
(74) *Attorney, Agent, or Firm* — Morgan, Lewis & Bockius LLP

(57) ABSTRACT

A foldable display apparatus and a manufacturing method of an adhesive layer of the same are disclosed. A foldable display apparatus in the embodiments of the present disclosure includes a display panel, a polarizing plate being disposed on the display panel, a cover window being disposed on the polarizing plate, and an adhesive layer being disposed between the polarizing plate and the cover window, wherein the adhesive layer comprises a transparent part being disposed in a position corresponding to a display area of the display panel, and a colored part being disposed in a position corresponding to a non-display area of the display panel.

17 Claims, 4 Drawing Sheets

(51) Int. Cl.
  *G02B 1/14* (2015.01)
  *G02B 5/20* (2006.01)
  *G02B 5/30* (2006.01)
  *G09F 9/30* (2006.01)

(52) U.S. Cl.
  CPC ...... *C09J 2301/21* (2020.08); *C09J 2301/304* (2020.08); *C09J 2301/408* (2020.08); *G06F 1/1652* (2013.01)

(56) References Cited

U.S. PATENT DOCUMENTS

2021/0091134 A1* 3/2021 Yoon .................... H10F 39/196
2023/0263036 A1   8/2023 Chiang et al.

FOREIGN PATENT DOCUMENTS

| CN | 111816688 A | 10/2020 |
| KR | 10-1286988 B1 | 7/2013 |
| KR | 20-2013-0005101 U | 8/2013 |

* cited by examiner

FIG. 6
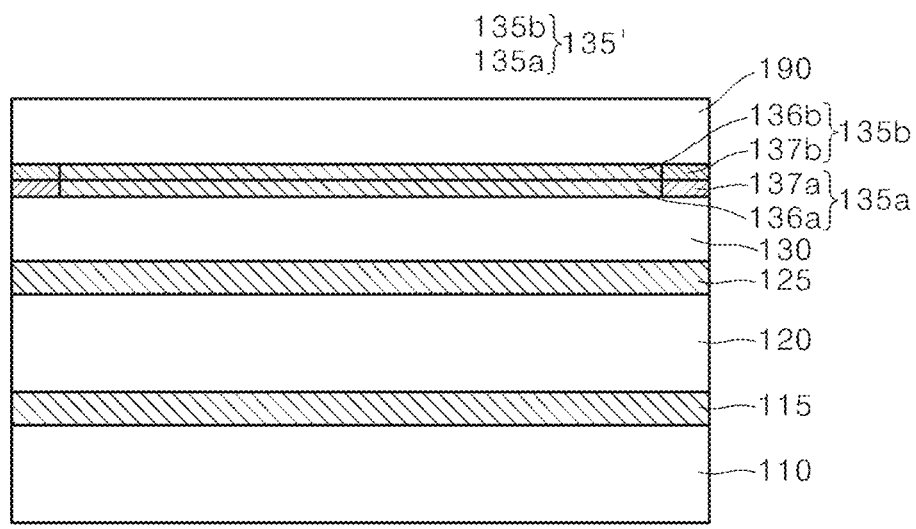
FIG. 7
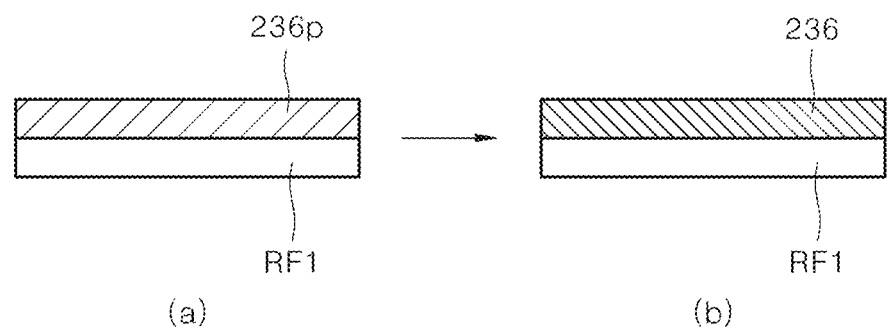
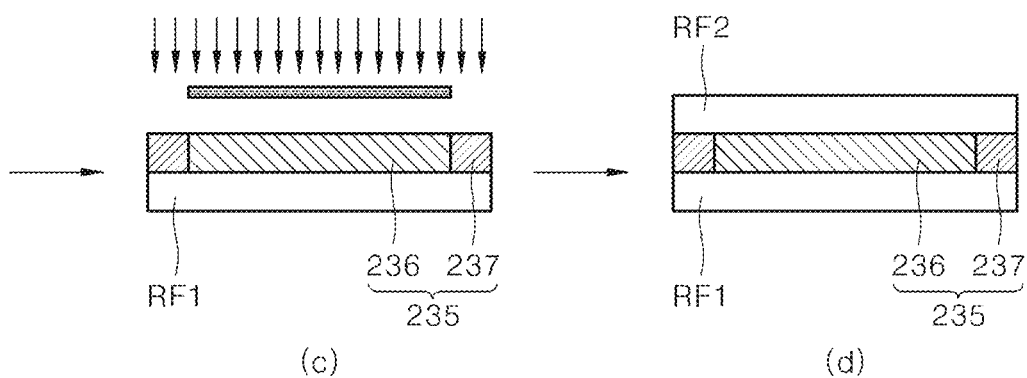

FOLDABLE DISPLAY APPARATUS AND MANUFACTURING METHOD OF ADHESIVE LAYER OF THE SAME

CROSS-REFERENCE TO RELATED APPLICATION

This application claims priority to and benefit of Korean Patent Application No. 10-2021-0099169 filed on Jul. 28, 2021, which is hereby incorporated by reference as when fully set forth herein.

BACKGROUND

Technical Field

The present disclosure relates to a foldable display apparatus, and in particular, a foldable display apparatus that includes a partially colored adhesive layer.

Discussion of the Related Art

In the information era, various types of display apparatuses that process and display a large amount of information have been developed and widely used. Display apparatuses that display images include a variety of display apparatuses such as a liquid crystal display (LCD) apparatus, an organic light-emitting display (OLED) apparatus, an electrophoresis display (EPD) apparatus and the like.

Currently, users tend to prefer a portable display apparatus having a large screen such that they can conveniently watch broadcast contents or videos, or play video games through the display apparatus. However, a larger screen of the portable display apparatus can cause deterioration in the portability of the apparatus, and has size limitations. To improve the portability of the portable display apparatus, research into a foldable display apparatus in which a display panel can be folded has been conducted.

SUMMARY

A variety of form factors have been developed in relation to foldable display apparatuses, and foldable display apparatuses having small thickness are needed to be applied to such a variety of form factors. Under the circumstances, the inventors have devised a foldable display apparatus having small thickness through experiments.

Accordingly, embodiments of the present disclosure are directed to a foldable display apparatus and a manufacturing method of an adhesive layer of the same that substantially obviates one or more of the problems due to limitations and disadvantages of the related art.

An aspect of the present disclosure is to provide a foldable display apparatus that ensures a reduction in the thickness and improvement in the folding properties.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a foldable display apparatus comprises a display panel, a polarizing plate being disposed on the display panel, a cover window being disposed on the polarizing plate, and an adhesive layer being disposed between the polarizing plate and the cover window, and the adhesive layer includes a transparent part being disposed in a position corresponding to a display area of the display panel and a colored part being disposed in a position corresponding to a non-display area of the display panel.

A foldable display apparatus in an embodiment includes a display panel, a polarizing plate being disposed on the display panel, a cover window being disposed on the polarizing plate, and a partially colored adhesive layer being disposed between the polarizing plate and the cover window, and the adhesive layer includes a thermosetting polymer containing an irreversible photochromic pigment or an irreversible photochromic dye.

In another aspect, a manufacturing method of an adhesive layer of an foldable display apparatus comprises: coating an adhesive composition on a first release film, the adhesive composition containing an irreversible photochromic pigment or an irreversible photochromic dye that is discolored irreversibly because of the irradiation of ultraviolet rays; curing the adhesive composition using heat to form a transparent adhesive layer; forming a colored part by irradiating ultraviolet rays to the transparent adhesive layer using a mask that covers regions except for edge regions of the transparent adhesive layer, to form a partially colored adhesive layer; and stacking a second release film on the partially colored adhesive layer.

Particulars in relation to the other embodiments are included in the detailed description and drawings.

In the embodiments of the present disclosure, an adhesive layer including a colored part is applied such that a light-shielding layer and a protective substrate provided for forming the light-shielding layer are removed, thereby ensuring a decrease in the entire thickness of a foldable display apparatus and enabling the foldable display apparatus to be folded with less curvature radius than a foldable display apparatus which including the light-shielding layer and the protective substrate. Thus, the foldable display apparatus in a folding state has less thickness than the foldable display apparatus which including the light-shielding layer and the protective substrate.

In the embodiment of the present disclosure, the number of stacked components in the foldable display apparatus decreases, thereby simplifying manufacturing process and reducing manufacturing costs.

In the embodiment of the present disclosure, since a layer that blocks ultraviolet rays is disposed in the uppermost part, i.e., a cover window, it is possible to prevent a change in the color of a transparent part of a third adhesive layer by ultraviolet rays, and also prevent a change in the physical properties of a polarizing plate by ultraviolet rays such that even when exposed to ultraviolet light for a long time, it is possible to prevent or reduce the problem that the reflection color of the foldable display apparatus 100 is greenish.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain various principles. In the drawings:

FIGS. 3 to 6 are cross-sectional views showing foldable display apparatus in embodiments; and FIG. 7 is a view showing a manufacturing method of an adhesive film of a third adhesive layer in FIG. 3.

DETAILED DESCRIPTION

Figure 1:
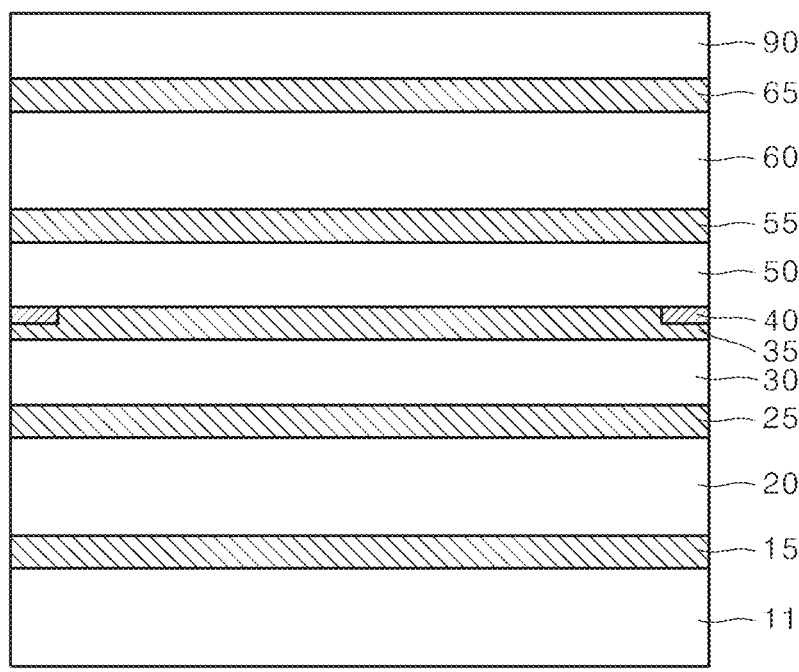
FIG. 1 is a cross-sectional view showing a foldable display apparatus in an experimental example.

Advantages and features in the present disclosure and a method of ensuring the same can be clearly understood from embodiments that are described with reference to the accompanying drawings. The subject matter of the present disclosure, however, can be embodied in various different forms, and should not be construed as being limited to the embodiments set forth herein. Rather, the embodiments are provided as examples so that the present disclosure can be thorough and complete and that the scope of the disclosure can be fully conveyed to one having ordinary skill in the art. The subject matter of the present disclosure should be defined only according to the scope of the appended claims.

The shapes, sizes, ratios, angles, number and the like of the components illustrated in the drawings provided for describing the embodiments of the present disclosure are given only as examples, and the subject matter of the present disclosure is not limited by the particulars in the drawings. Throughout the disclosure, like reference numerals denote like components. In describing the subject matter, detailed description of well-known technologies relevant to the present disclosure is omitted if it is deemed to make the gist of the disclosure unnecessarily vague. Throughout the disclosure, the terms "comprising", "having", "being comprised of" and the like should imply the inclusion of any other component, but for the term "only". Further, the singular forms "a", "an" and "the" are intended to include the plural forms as well, unless explicitly stated otherwise.

In describing a component, the margin of error is to be included, though not explicitly described.

In the disclosure, when spatial terms such as "being on", "being in an upper portion", "being in a lower portion", "being adjacent to" and the like are used to describe a position relationship between two components, one or more additional components can be interposed between the two components unless terms such as "right" or "directly" are used.

In describing components, terms such as first, second and the like can be used. These terms are only intended to distinguish a component from another component, and the components are not limited by such terms. Accordingly, a first component described below can be a second component within the technical spirit of the disclosure.

Throughout the disclosure, identical reference numerals can denote identical components.

The size and thickness of each component in the drawings are to provide convenience for description, and the size and thickness of each component are not necessarily limited to the size and thickness illustrated in the drawings.

Features of the embodiments of the disclosure can be partially or entirely mixed or combined, and can technically interlock and operate in various ways as one having ordinary skill in the art understands sufficiently. Further, each embodiment can be embodied independently, or in connection with each other.

Hereafter, foldable display apparatuses in the embodiments of the present disclosure are described with reference to the accompanying drawings.

FIG. 1 is a cross-sectional view showing a foldable display apparatus in an experimental example.

Referring to FIG. 1, the foldable display apparatus 10 in the experimental example may include a support structure 11, a first adhesive layer 15, a display panel 20, a second adhesive layer 25, a polarizing plate 30, a third adhesive layer 35, a light-shielding layer 40, a first protective substrate 50, a fourth adhesive layer 55, a second protective substrate 60, a fifth adhesive layer 65, and a cover window 90.

The display panel 20 can display an image. For example, the display panel 20 may be embodied as an organic light-emitting display panel.

The support structure 11 can support the display panel 20.

The polarizing plate 30 may be provided to ensure the visibility of the display panel 20.

The light-shielding layer 40 may be configured to prevent a driving circuit, various wires, a pad part and the like in the edge portions, e.g., the non-display area, of the display panel 20 from being seen. In an example, the light-shielding layer 40 may be disposed in the edge portions of one surface, e.g., the lower surface, of the first protective substrate 50. In another example, the light-shielding layer 40 may be disposed in the edge portions of the upper surface of the first protective substrate 50. The light-shielding layer 40 may be formed in the edge portion of one surface of the first protective substrate 50, corresponding to the non-display area of the display panel 20. The light-shielding layer 40 may be formed into a ring. For example, the light-shielding layer 40 may be formed based on a printing method using black ink but not limited. For example, since the light-shielding layer 40 is disposed along the non-display area of the display panel 20, the light-shielding layer in the non-display area is visible, resulting in deterioration in aesthetic qualities. There is a problem in that the thickness of the third adhesive layer 35 is increased in order to planarize a step caused by the light-shielding layer 40.

The second protective substrate 60 may be disposed on the first protective substrate 50, and the cover window 90 may be disposed on the second protective substrate 60. The second protective substrate 60 and the cover window 90 may protect the first protective substrate 50, the polarizing plate 30 and the display panel 20 from an external impact, moisture, heat and the like. The second protective substrate 60 may be made of glass, e.g., tempered glass. The cover window 90 may be disposed on the upper surface of the second protective substrate 60. In this case, when the second protective substrate 60 is broken into small pieces by an external force or stress, the cover window 90 may prevent the small pieces of the second protective substrate 60 from scattering.

The first adhesive layer 15 may bond the support structure 11 and the display panel 20. The second adhesive layer 25 may bond the display panel 20 and the polarizing plate 30. The third adhesive layer 35 may bond the polarizing plate 30 and the first protective substrate 50. The fourth adhesive layer 55 may bond the first protective substrate 50 and the second protective substrate 60. The fifth adhesive layer 65 may bond the second protective substrate 60 and the cover window 90. The first to fifth adhesive layers 15, 25, 35, 45, 55 may include an optically clear adhesive (OCA) or a pressure sensitive adhesive (PSA), but not be limited.

Figure 2:
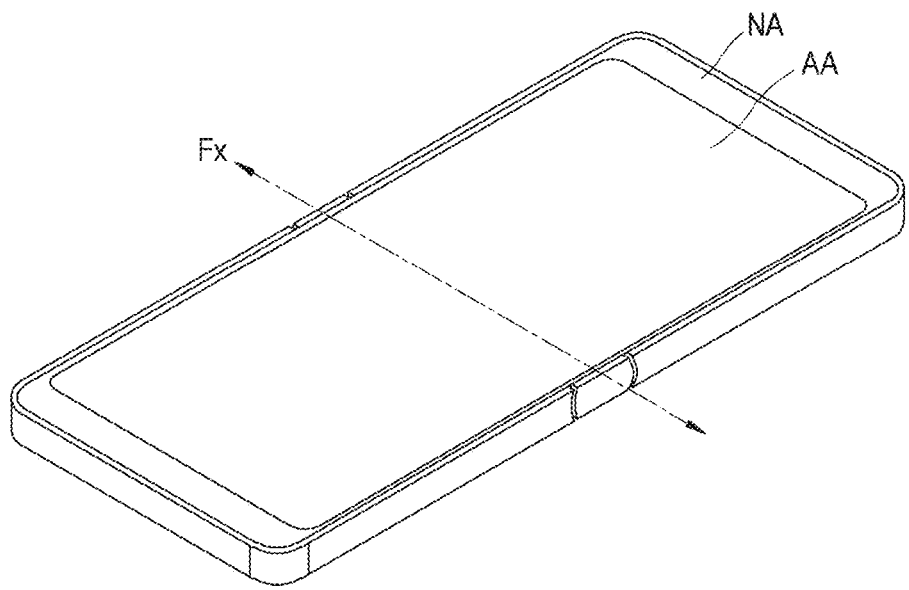
FIG. 2 is a perspective view showing a foldable display apparatus in an embodiment.

FIG. 2 is a perspective view showing a foldable display apparatus in an embodiment.

Referring to FIG. 2, the foldable display apparatus 100 in the embodiment may include a display area AA, a non-display area NA, and a foldable area. The display area AA may be an area in which an image is displayed. The non-display area NA may be an area which is at the edge of the display area AA and in which an image is not displayed. The foldable area is formed around a folding axis Fx and may be an area that overlaps a portion of the display area AA and a portion of the non-display area NA. For example, the foldable area may be an area that is curved with a predetermined curvature radius when the foldable display apparatus 100 is folded using at least one of an inner folding method and an outer folding method. An area outside the foldable area may be a non-foldable area. Additionally, the foldable display apparatus 100 may further include a hinge structure for folding the display panel and the like, and a casing that supports and stores the display panel and the like.

Figure 3:
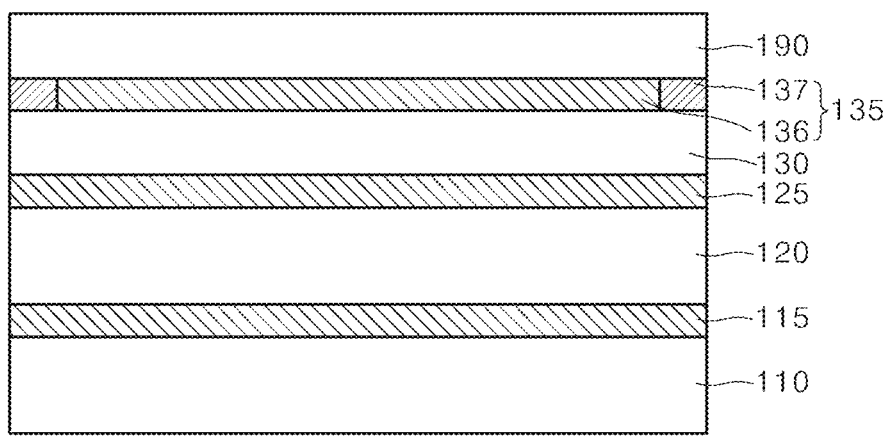

FIG. 3 is a cross-sectional view showing a foldable display apparatus in an embodiment.

Referring to FIG. 3, the foldable display apparatus 100 in the embodiment may include a support structure 110, a first adhesive layer 115, a display panel 120, a second adhesive layer 125, a polarizing plate 130, a third adhesive layer 135, and a cover window 190.

The display panel 120 may be disposed on the support structure 110, and the polarizing plate 130 may be disposed on the display panel 120. Additionally, the cover window 190 may be disposed on the polarizing plate 130.

The display panel 120 may display an image. The display panel 120 may be flexible and display an image for a user. In an example, the display panel 120 may be formed into an organic light-emitting display panel, but not be limited. The display panel 120 may include various types of display panels such as a liquid crystal display panel, an electrophoretic display panel and the like. When the display panel 120 is an organic light-emitting display panel, the display panel 120 may include a thin film transistor array where thin film transistors (including switching thin film transistor and driving thin film transistor) are formed for each pixel on a substrate, an organic light-emitting layer where organic light-emitting elements connecting to the driving thin film transistor are formed for each pixel, and an encapsulation layer which covers the organic light-emitting layer and prevents external moisture and oxygen from coming into the organic light-emitting layer. The display panel 120 may further include a touch electrode array being formed on the encapsulation layer. In another example, the display panel 120 may be an inorganic light-emitting display panel or a quantum dot display panel.

The support structure 110 may support the display panel 120. The support structure 110 may include at least one or more of support layers. The support structure 110 may be attached to the display panel 120 by an adhesive layer. The support layer has greater stiffness than the display panel 120. For example, the support layer may be comprised of metal such as stainless steel (SUS) or a polymer such as polymethylmetacrylate (PMMA), polycarbonate (PC), polyacrylate (PA), polyvinyl alcohol (PVA), acrylonitrile-butadiene-styrene (ABS), polyethylene terephthalate (PET), polyimide (PI) and the like, but not limited. The support structure 110 may have a structure in which at least one or more of the support layers are bonded by the adhesive layer. A plurality of folding patterns may be discontinuously provided at a position corresponding to the foldable area on at least one or more of the support layers. The folding patterns may be holes or slits that pass through at least one or more of the support layer, but not limited.

The first adhesive layer 115 may be disposed between the support structure 110 and the display panel 120. For example, the first adhesive layer 115 may bond the support structure 110 and the display panel 120. The first adhesive layer 115 may include an optically clear adhesive (OCA) or a pressure sensitive adhesive (PSA) but not be limited.

The polarizing plate 130 may be provided to ensure the visibility of the display panel 120. For example, the polarizing plate 130 may include a transparent substrate, a polarizer being disposed on the lower surface of the transparent substrate, and a phase difference layer being disposed on the lower surface of the polarizer. The phase difference layer may include a phase retardation layer, and a C plate being disposed on the lower surface of the phase retardation layer.

The second adhesive layer 125 may be disposed between the display panel 120 and the polarizing plate 130. For example, the second adhesive layer 125 may bond the display panel 120 and the polarizing plate 130. The second adhesive layer 125 may include an optically clear adhesive (OCA) or a pressure sensitive adhesive (PSA) but not be limited. For example, the second adhesive layer 125 may be made of the same material as the first adhesive layer 115.

The cover window 190 may protect the display panel 120 and the like from an external impact, moisture or heat and the like. The cover window 190 may include a polymer film. For example, the polymer film may be transparent. The polymer film may include polyethylene terephthalate (PET), colorless polyimide (PI), or a laminate of PET and colorless PI and the like, but not be limited. The cover window 190 may further include a first layer being formed on the transparent polymer film. For example, the first layer may be a hard coating layer, and not be limited to the term. For example, the first layer may be transparent. The first layer may contain an ultraviolet absorber. The ultraviolet absorber may include at least one or more of absorbers based on benzotriazol, benzophenone, salicylic acid, salicylate, cyanoacrylate, cinnamate, oxanilide, polystyrene, azomethine or triazine, but not be limited. The first layer may include a cross-linked copolymer of an acrylate-based monomer and a photo-curable elastomer. The acrylate-based monomer may include hydroxyethyl acrylate (HEA), hydroxyethyl methacrylate (HEMA), hexanediol diacrylate (HDDA), tripropylene glycol diacrylate (TPGDA), ethylene glycol diacrylate (EGDA), trimethylolpropane triacrylate (TMPTA), trimethylolpropane ethoxy triacrylate (TMPEOTA), glycerol propoxylated triacrylate (GPTA), pentaerythritol tetraacrylate (PETA) or dipentaerythritol hexaacrylate (DPHA) and the like, for example. The photo-curable elastomer may be a polymer or an oylgomer having weight-average molecular weight of about 1,000 to about 600,000 g/mol or about 10,000 to about 600,000 g/mol. The photo-curable elastomer may be one or more of polycaprolactone, urethane acrylate-based polymers, and polyrotaxane, for example. The thickness of the first layer may not be limited but may be within a range of 1 to 10 μm. For example, the first layer of the cover window 190 includes the ultraviolet absorber such that the discoloration of a below-described transparent part 136 of the third adhesive layer 135, caused due to its exposure to ultraviolet rays, is prevented.

The third adhesive layer 135 may be disposed between the polarizing plate 130 and the cover window 190. For example, the third adhesive layer 135 may bond the polarizing plate 130 and the cover window 190. The third adhesive layer 135 may be an optically clear adhesive (OCA) that is partially colored. The third adhesive layer 135 may include a transparent part 136 being disposed in a position corresponding to the display area AA of the display panel 120, and a colored part 137 being disposed in a position corresponding to the non-display area NA of the display panel 120. The colored part 137 may be provided to make a driving circuit, various wires, a pad part and the like in the edge portion, e.g., the non-display area NA, of the display panel 120 invisible. The colored part 137 may be formed into a ring shape. The colored part 137 is not transparent and may have various colors.

The third adhesive layer 135 may include a thermosetting polymer containing an irreversible photochromic pigment or an irreversible photochromic dye that is discolored irreversibly by the irradiation of ultraviolet rays. The thermosetting polymer may include at least one or a mixture of two or more of acryl-based resin, urethane-based resin, silicone-based resin, acryl-based copolymer, urethane-based copolymer, and silicone-based copolymer. The irreversible photochromic pigment or the irreversible photochromic dye is colorless before the irradiation of ultraviolet rays, and after the irradiation of ultraviolet rays, is colored because of an irreversible change in the molecular structure of the irreversible photochromic pigment or the irreversible photochromic dye. The irreversible photochromic pigment includes a quinoline-based pigment, and the quinoline-based pigment includes 1,2-dihydro-2,2,4-trimethylquinoline or 1,2-dihydro-2,2,4-trimethyl-N-acetylquinoline and the like, for example.

The irreversible photochromic dye may be one of the following dyes, for example.

The third adhesive layer 135 may be manufactured as an adhesive film, and then attached to the polarizing plate 130 and the cover window 190. The colored part 137 may be a part that is irradiated with ultraviolet rays and colored irreversibly in the process of manufacturing the adhesive film, and the transparent part 136 may be a part that is not irradiated with ultraviolet rays. A method of manufacturing the adhesive film used for the third adhesive layer 135 is described below with reference to FIG. 7.

In the foldable display apparatus 100 of the embodiment, the third adhesive layer 135 bonding the polarizing plate 130 and the cover window 190 includes the colored part that is substituted for the light-shielding layer. Thus, the light-shielding layer and the protective substrate for forming the light-shielding layer may be omitted from the foldable display apparatus 100 of the embodiment. For example, since the third adhesive layer 135 is provided, the light-shielding layer may not be disposed along the edge of the display area of the foldable display apparatus 100, and since it is not necessary to increase the thickness of the third adhesive layer for planarizing for the step of the light-shielding layer, the thickness of the third adhesive layer may be reduced. Thus, the thickness of the foldable display apparatus 100 may be reduced, and the deterioration in the aesthetic qualities, caused by the light-shielding layer of the non-display area, may decrease. The foldable display apparatus 100 in the embodiment may have a thickness that is entirely less than the foldable display apparatus 10 in the experimental example of FIG. 1, and its folding properties may improve. The foldable display apparatus 100 in the embodiment may be folded with less curvature radius than the display apparatus 10 in the experimental example. As a result, a foldable display apparatus 100 in the embodiment

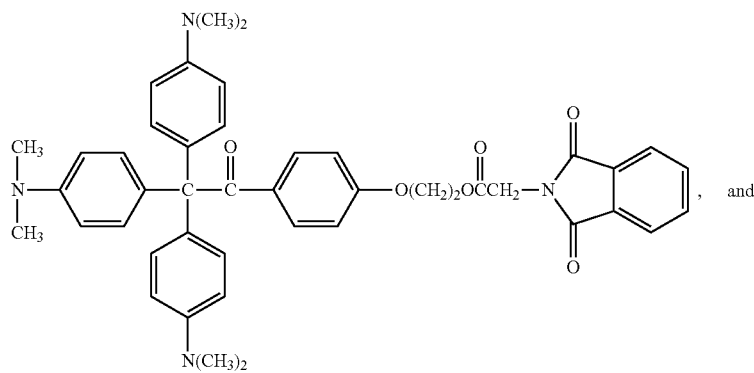, and

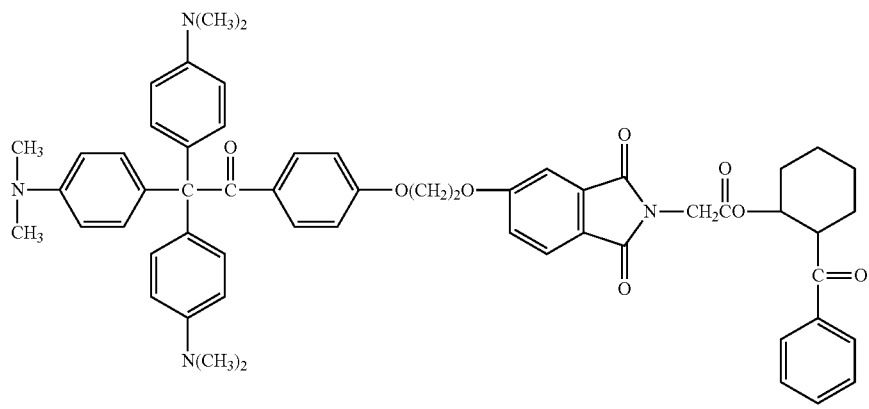

may have a less thickness in a folding state than the foldable display apparatus 10 in the experiment example. Additionally, the foldable display apparatus 100 in the embodiment may have a less number of stacked components than the display apparatus 10 in the experimental example, leading to a simple manufacturing process and a reduction in manufacturing costs. Further, in the foldable display apparatus 100 of the embodiment, since the first layer that blocks ultraviolet rays is included in the cover window, a change in the physical properties of the polarizing plate 130, caused by ultraviolet rays, may be prevented, and even when exposed to ultraviolet light for a long time, it is possible to prevent or reduce the problem that the reflection color of the foldable display apparatus 100 is greenish.

Figure 4:
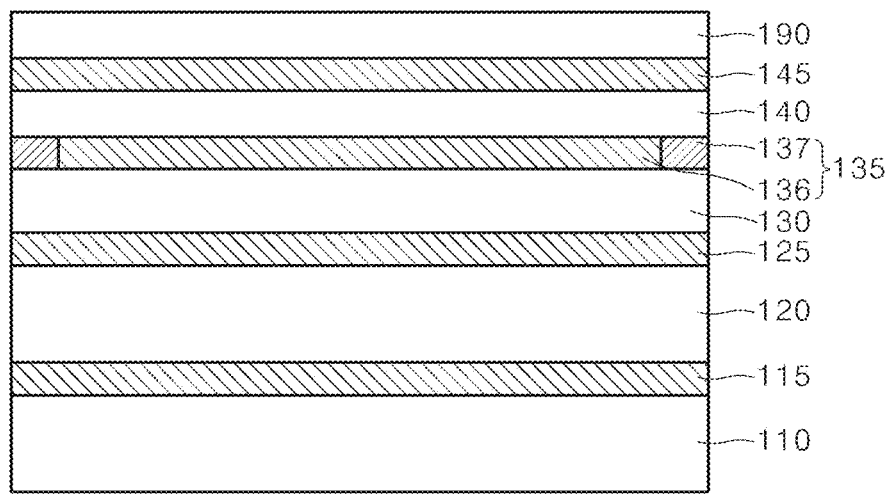

FIG. 4 is a cross-sectional view showing a foldable display apparatus in an embodiment.

Referring to FIG. 4, the foldable display apparatus 100-1 in the embodiment may further include a protective substrate 140 and a fourth adhesive layer 145 compared to the foldable display apparatus 100 illustrated in FIG. 3. Hereafter, the other components in FIG. 4 have the same reference numerals as those in FIG. 3, and the description provided with reference to FIG. 3 is omitted, for brief description.

The protective substrate 140 may be disposed on the display panel 120 and protect the display panel 120. The protective substrate 140 may be disposed between the cover window 190 and the third adhesive layer 135. The protective substrate 140 may be transparent. The protective substrate 140 may be made of glass, e.g., tempered glass. In the case of a protective substrate 140 made of glass, the protective substrate 140 may have a thickness of 30 to 200 μm to satisfy strength properties and folding properties. In an example, the protective substrate 140 may have a uniform thickness across the entire area. In another example, the protective substrate 140 may include a polymer film of polyimide (PI), polyethylene terephthalate (PET), propylene glycol (PPG), polycarbonate (PC) and the like, but not be limited.

The fourth adhesive layer 145 may be disposed between the protective substrate 140 and the cover window 190. For example, the fourth adhesive layer 145 may bond the protective substrate 140 and the cover window 190. The fourth adhesive layer 145 may include an optically clear adhesive (OCA) or a pressure sensitive adhesive (PSA), but not be limited. For example, the fourth adhesive layer 145 may be made of the same material as one or more of the first adhesive layer 115 and the second adhesive layer 125.

The foldable display apparatus 100-1 in FIG. 4 may include the third adhesive layer 135 like the foldable display apparatus 100 in FIG. 3. Accordingly, the light-shielding layer and the protective substrate for forming the light-shielding layer may be omitted in the foldable display apparatus 100-1. As a result, the foldable display apparatus 100-1 in FIG. 4 may have an effect that is the same as or similar to the effect of the foldable display apparatus 100 in FIG. 3.

Figure 5:
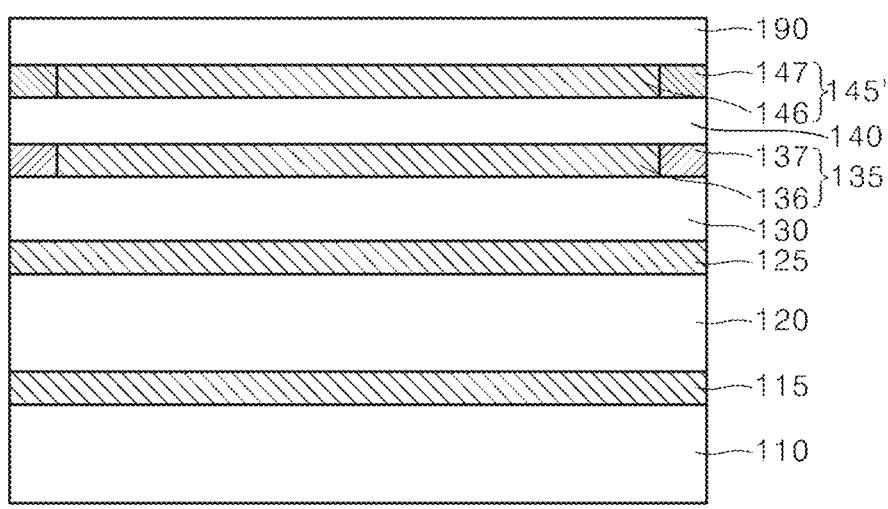

FIG. 5 is a cross-sectional view showing a foldable display apparatus in an embodiment.

Referring to FIG. 5, the foldable display apparatus 100-2 in the embodiment may further include a protective substrate 140 and a fourth adhesive layer 145' compared to the foldable display apparatus 100 illustrated in FIG. 3. Hereafter, the other components in FIG. 5 have the same reference numerals as those in FIG. 3, and the description provided with reference to FIG. 3 is omitted, for brief description.

The fourth adhesive layer 145' may include a transparent part 146 being disposed in a position corresponding to the display area AA of the display panel 120, and a colored part 147 being disposed in a position corresponding to the non-display area NA of the display panel 120. The colored part 147 may be provided to make a driving circuit, various wires, a pad part and the like in the edge portion, e.g., the non-display area NA, of the display panel 120 invisible. The colored part 147 may be formed into a ring shape. The colored part 147 is not transparent and may have various colors.

The transparent part 136 of the third adhesive layer 135 may be a first transparent part, and the colored part 137 of the third adhesive layer 135 may be a first colored part. The transparent part 146 of the fourth adhesive layer 145' may be a second transparent part, and the colored part 147 of the fourth adhesive layer 145' may be a second colored part.

The second transparent part 146 of the fourth adhesive layer 145' may overlap the first transparent part 136 of the third adhesive layer 135, and the second colored part 147 of the fourth adhesive layer 145' may overlap the first colored part 137 of the third adhesive layer 135. The second colored part 147 of the fourth adhesive layer 145' may have a different color from the first colored part 137 of the third adhesive layer 135. Various colors may be embodied based on a combination of the color of the first colored part 137 and the color of the second colored part 147.

Like the foldable display apparatus 100 in FIG. 3, the foldable display apparatus 100-2 in FIG. 5 may include the third adhesive layer 135 and the fourth adhesive layer 145'. Accordingly, the light-shielding layer and the protective substrate for forming the light-shielding layer may be omitted from the foldable display apparatus 100-2 in FIG. 5. As a result, the foldable display apparatus 100-2 in FIG. 5 may have an effect that is the same as or similar to the effect of the foldable display apparatus 100 in FIG. 3.

FIG. 6 is a cross-sectional view showing a foldable display apparatus in an embodiment.

Referring to FIG. 6, a third adhesive layer 135' of the foldable display apparatus 100-3 in the embodiment may include two layers unlike the third adhesive layer 135 of the foldable display apparatus 100 in FIG. 3. Hereafter, the other components in FIG. 6 have the same reference numerals as those in FIG. 3, and the description provided with reference to FIG. 3 is omitted, for brief description.

The third adhesive layer 135' may be comprised of a lower adhesive layer 135a and an upper adhesive layer 135b. The lower adhesive layer 135a of the third adhesive layer 135' may include a first transparent part 136a and a first colored part 137a. The upper adhesive layer 135b of the third adhesive layer 135' may include a second transparent part 136b and a second colored part 137b. The lower adhesive layer 135a may be a first adhesive layer, and the upper adhesive layer 135b may be a second adhesive layer.

The second transparent part 136b of the upper adhesive layer 135b may overlap the first transparent part 136a of the lower adhesive layer 135a, and the second colored part 137b of the upper adhesive layer 135b may overlap the first colored part 137a of the lower adhesive layer 135a. The second colored part 137b of the upper adhesive layer 135b may have a different color from the first colored part 137a of the lower adhesive layer 135a. Various colors may be embodied based on a combination of the color of the first colored part 137a and the color of the second colored part 137b.

The foldable display apparatus 100-3 in FIG. 6 includes the third adhesive layer 135'. Accordingly, the light-shielding layer and the protective substrate for forming the light-shielding layer may be omitted from the foldable display apparatus 100-3 in FIG. 6. As a result, the foldable display apparatus 100-3 in FIG. 6 may have an effect that is the same as or similar to the effect of the foldable display apparatus 100 in FIG. 3.

FIG. 7 is a view showing a manufacturing method of an adhesive film capable of being used as a third adhesive layer in FIG. 3.

Referring to FIG. 7(*a*), an adhesive composition 236*p*, which includes an irreversible photochromic pigment or an irreversible photochromic dye that is discolored because of the irradiation of ultraviolet rays, is coated on a first release film RF1. The first release film RF1 may include at least one or more of polyethylene terephthalate (PET), polypropylene (PP) or polyethylene (PE). The adhesive composition 236*p* may include a mixture of at least one or more of acryl-based resin, urethane-based resin, silicone-based resin, acryl-based copolymer, urethane-based copolymer, and silicone-based copolymer, and an irreversible photochromic pigment (or an irreversible photochromic dye). The irreversible photochromic pigment (or the irreversible photochromic dye) is described above.

Referring to FIG. 7(*b*), the adhesive composition 236*p* is cured using heat to form a transparent adhesive layer 236.

Referring to FIG. 7(*c*), a colored part 237 is formed by irradiating ultraviolet rays to the cured transparent adhesive layer 236 using a mask that covers the remaining regions except for some regions (edge regions) of the cured transparent adhesive layer 236. Accordingly, a partially colored adhesive layer 235 is formed.

Referring to FIG. 7(*d*), a second release film RF2 is stacked on the partially colored adhesive layer 235. The second release film RF2 may include at least one or more of polyethylene terephthalate (PET), polypropylene (PP) or polyethylene (PE). The second release film RF2 may be thinner than the first release film RF1.

The manufacturing method of the adhesive film may be applied to the fourth adhesive layer 145' in FIG. 5, and the lower adhesive layer 135*a* and the upper adhesive layer 135*b* of the third adhesive layer 135' in FIG. 6, in the same way or a similar way.

A foldable display apparatus in the embodiments of the present disclosure is described as follows.

The foldable display apparatus in the embodiments includes a display panel, a polarizing plate being disposed on the display panel, a cover window being disposed on the polarizing plate, and an adhesive layer being disposed between the polarizing plate and the cover window, and the adhesive layer includes a transparent part being disposed in a position corresponding to a display area of the display panel and a colored part being disposed in a position corresponding to a non-display area of the display panel.

In several embodiments, the adhesive layer may include a thermosetting polymer containing an irreversible photochromic pigment or an irreversible photochromic dye that is discolored irreversibly because of the irradiation of ultraviolet rays.

In several embodiments, the irreversible photochromic pigment may include a quinoline-based pigment. The quinoline-based pigment may include 1,2-dihydro-2,2,4-trimethylquinoline or 1,2-dihydro-2,2,4-trimethyl-N-acetylquinoline.

In several embodiments, the irreversible photochromic dye may include any one of the following dyes.

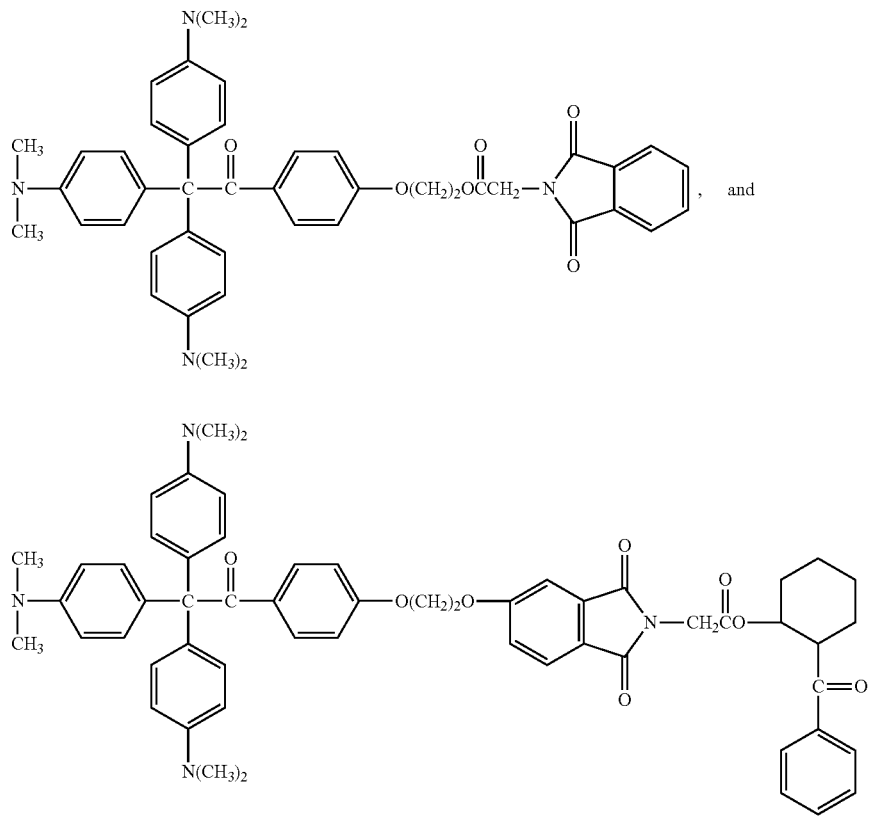

In several embodiments, the adhesive layer may bond the polarizing plate and the cover window.

In several embodiments, the foldable display apparatus may further include a protective substrate being disposed between the polarizing plate and the cover window, and the adhesive layer may be a first adhesive layer that bonds the polarizing plate and the protective substrate.

In several embodiments, the foldable display apparatus may further include a second adhesive layer being disposed between the protective substrate and the cover window and bonding the protective substrate and the cover window, and the first adhesive layer may include a first transparent part being disposed in a position corresponding to a display area of the display panel and a first colored part being disposed in a position corresponding to a non-display area of the display panel, and the second adhesive layer may include a second transparent part overlapping the first transparent part and a second colored part overlapping the first colored part.

In several embodiments, the second colored part may have a different color from the first colored part.

In several embodiments, the ultraviolet absorber may include at least one or more of absorbers based on benzotriazol, benzophenone, salicylic acid, salicylate, cyanoacrylate, cinnamate, oxanilide, polystyrene, azomethine and triazine.

A foldable display apparatus in the embodiments includes a display panel, a polarizing plate being disposed on the display panel, a cover window being disposed on the polarizing plate, and an adhesive layer that is partially colored and disposed between the polarizing plate and the cover window, and the adhesive layer may include a thermosetting polymer containing an irreversible photochromic pigment or an irreversible photochromic dye.

In several embodiments, the irreversible photochromic pigment may include a quinoline-based pigment, and the quinoline-based pigment may include 1,2-dihydro-2,2,4-trimethylquinoline or 1,2-dihydro-2,2,4-trimethyl-N-acetylquinoline.

In several embodiments, the irreversible photochromic dye may include any one of the following dyes.

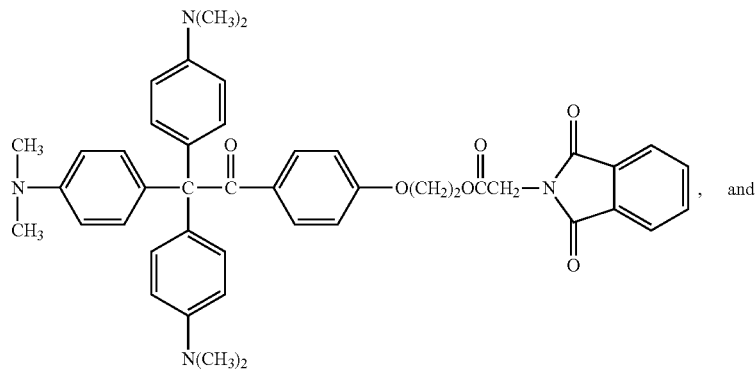

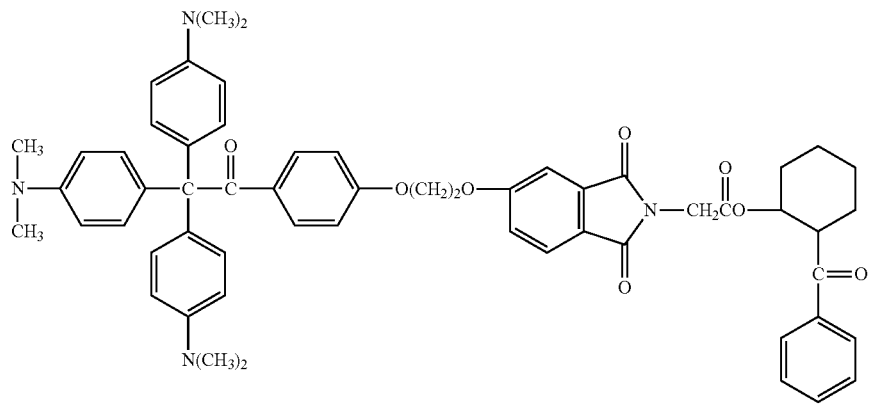

In several embodiments, the adhesive layer may include a lower adhesive layer and an upper adhesive layer, the lower adhesive layer may include a first transparent part being disposed in a position corresponding to a display area of the display panel and a first colored part being disposed in a position corresponding to a non-display area of the display panel, and the upper adhesive layer may include a second transparent part overlapping the first transparent part and a second colored part overlapping the first colored part.

In several embodiments, the cover window may include a hard coating layer containing an ultraviolet absorber.

In several embodiments, the cover window may include a hard coating layer containing an ultraviolet absorber.

It will be apparent to those skilled in the art that various modifications and variations can be made in the foldable display apparatus and the manufacturing method of an adhesive layer of the same of the present disclosure without departing from the technical idea or scope of the disclosure. Thus, it is intended that the present disclosure cover the modifications and variations of this disclosure provided they come within the scope of the appended claims and their equivalents.

The invention claimed is:

1. A foldable display apparatus, comprising:
a display panel;
a polarizing plate being disposed on the display panel;
a cover window being disposed on the polarizing plate; and
an adhesive layer being disposed between the polarizing plate and the cover window,
wherein the adhesive layer comprises a transparent part being disposed in a position corresponding to a display area of the display panel, and a colored part being disposed in a position corresponding to a non-display area of the display panel,
wherein the adhesive layer comprises a thermosetting polymer containing an irreversible photochromic pigment or an irreversible photochromic dye that is discolored irreversibly by irradiation of ultraviolet ray.

2. The foldable display apparatus of claim 1, wherein the irreversible photochromic pigment comprises a quinoline-based pigment.

3. The foldable display apparatus of claim 2, wherein the quinoline-based pigment comprises 1,2-dihydro-2,2,4-trimethylquinoline or 1,2-dihydro-2,2,4-trimethyl-N-acetylquinoline.

4. The foldable display apparatus of claim 1, wherein the irreversible photochromic dye comprises any one of the following dyes

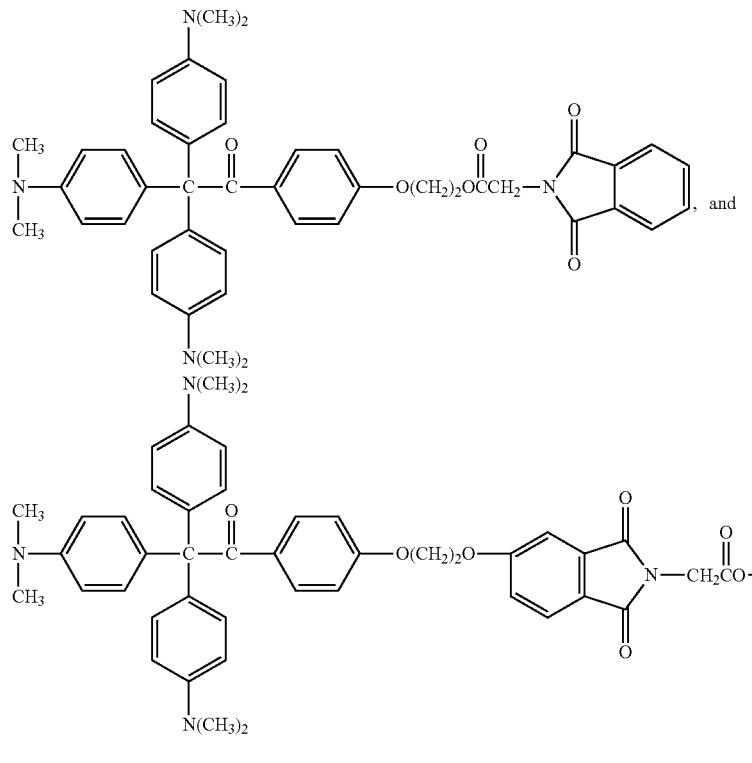

5. The foldable display apparatus of claim 1, wherein the adhesive layer bonds the polarizing plate and the cover window.

6. The foldable display apparatus of claim 1, wherein the foldable display apparatus further comprises a protective substrate being disposed between the polarizing plate and the cover window, and the adhesive layer is a first adhesive layer that bonds the polarizing plate and the protective substrate.

7. The foldable display apparatus of claim 6, wherein the foldable display apparatus further comprises a second adhesive layer being disposed between the protective substrate and the cover window,
the first adhesive layer comprises a first transparent part being disposed in a position corresponding to a display area of the display panel, and a first colored part being disposed in a position corresponding to a non-display area of the display panel, and
the second adhesive layer comprises a second transparent part overlapping the first transparent part, and a second colored part overlapping the first colored part.

8. The foldable display apparatus of claim 7, wherein the second colored part have a different color from the first colored part.

9. The foldable display apparatus of claim 1, wherein the adhesive layer comprises a lower adhesive layer and an upper adhesive layer,
the lower adhesive layer comprises a first transparent part being disposed in a position corresponding to a display area of the display panel, and a first colored part being disposed in a position corresponding to a non-display area of the display panel, and
the upper adhesive layer comprises a second transparent part overlapping the first transparent part, and a second colored part overlapping the first colored part.

10. The foldable display apparatus of claim 1, wherein the cover window comprises a first layer containing an ultraviolet absorber.

11. The foldable display apparatus of claim 10, wherein the ultraviolet absorber comprises at least one or more of absorbers based on benzotriazol, benzophenone, salicylic acid, salicylate, cyanoacrylate, cinnamate, oxanilide, polystyrene, azomethine and triazine.

12. A foldable display apparatus, comprising:
a display panel;
a polarizing plate being disposed on the display panel;
a cover window being disposed on the polarizing plate; and
an adhesive layer that is partially colored and disposed between the polarizing plate and the cover window,
wherein the adhesive layer comprises a thermosetting polymer containing an irreversible photochromic pigment or an irreversible photochromic dye, and
wherein the irreversible photochromic pigment comprises a quinoline-based pigment.

13. The foldable display apparatus of claim 12, wherein the quinoline-based pigment comprises 1,2-dihydro-2,2,4-trimethylquinoline or 1,2-dihydro-2,2,4-trimethyl-N-acetylquinoline.

14. The foldable display apparatus of claim 12, wherein the irreversible photochromic dye comprises any one of the following dyes

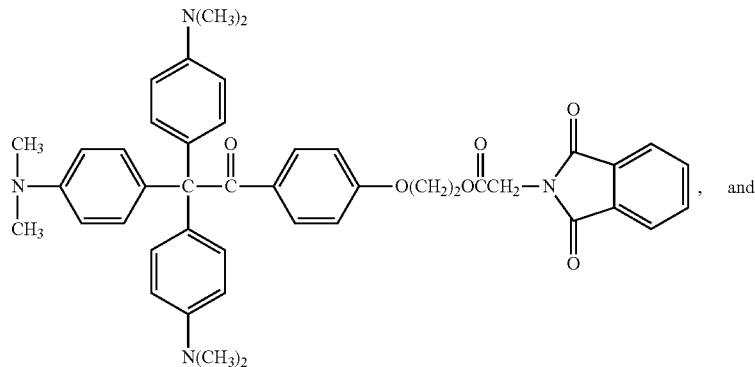
, and

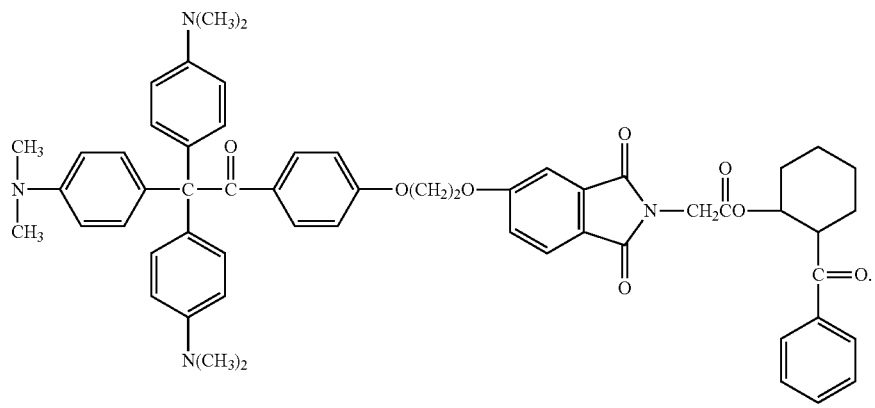
.

15. The foldable display apparatus of claim 12, wherein the cover window comprises a first layer containing an ultraviolet absorber.

16. A manufacturing method of the adhesive layer of the foldable display apparatus of claim 1, comprising:
   coating an adhesive composition on a first release film, the adhesive composition containing an irreversible photochromic pigment or an irreversible photochromic dye that is discolored irreversibly because of the irradiation of ultraviolet rays;
   curing the adhesive composition using heat to form a transparent adhesive layer;
   forming a colored part by irradiating ultraviolet rays to the transparent adhesive layer using a mask that covers regions except for edge regions of the transparent adhesive layer, to form a partially colored adhesive layer; and
   stacking a second release film on the partially colored adhesive layer.

17. The manufacturing method of claim 16, wherein the first release film and the second release film include at least one or more of polyethylene terephthalate, polypropylene and polyethylene, and
   the second release film is thinner than the first release film.

* * * * *